United States Patent [19]
Tokutake

[11] Patent Number: 5,240,068
[45] Date of Patent: Aug. 31, 1993

[54] HEAT EXCHANGER

[75] Inventor: Toshinori Tokutake, Oyamashi, Japan

[73] Assignee: Showa Aluminum Corporation, Japan

[21] Appl. No.: 889,471

[22] Filed: May 27, 1992

[30] Foreign Application Priority Data

May 31, 1991 [JP] Japan .................. 3-128948

[51] Int. Cl.$^5$ .................. F28F 9/02; F24H 9/06
[52] U.S. Cl. .................. 165/67; 165/153; 165/173; 248/232
[58] Field of Search .................. 165/67, 153, 173; 180/68.4; 248/232, 233

[56] References Cited

U.S. PATENT DOCUMENTS

| | | | |
|---|---|---|---|
| 3,121,467 | 2/1964 | Bryant | 165/67 |
| 3,213,931 | 10/1965 | Hilicki | 165/67 |
| 4,196,774 | 4/1980 | Hoffmann | 165/67 |
| 4,569,390 | 2/1986 | Knowlton et al. | 165/153 |
| 4,903,389 | 2/1990 | Wolf | 165/153 |
| 4,945,635 | 8/1990 | Nobusue et al. | 165/173 |
| 5,069,275 | 12/1991 | Suzuki et al. | 165/67 |
| 5,082,051 | 1/1992 | Ando | 165/173 |

FOREIGN PATENT DOCUMENTS

| | | | |
|---|---|---|---|
| 2304883 | 8/1974 | Fed. Rep. of Germany | 165/67 |
| 70994 | 3/1991 | Japan | 165/67 |
| 84398 | 4/1991 | Japan | 165/173 |
| 164694 | 7/1991 | Japan | 165/67 |

Primary Examiner—John Rivell
Assistant Examiner—L. R. Leo

[57] ABSTRACT

A heat exchanger comprises a main body and at least one header-held members, with the main body having a plurality of heat exchanging tubes whose both ends are connected to headers in fluid communication with them, wherein the header-held members are selected from a group consisting of a bracket and an external pipe-connecting member which are attached to the header. The header-held members each comprise a header-surrounding portion which is fitted sideways on and then brazed to the header while remaining self-retained on it, whereby the header-held member can be easily and rigidly secured to the header.

12 Claims, 9 Drawing Sheets

HEAT EXCHANGER

BACKGROUND OF THE INVENTION

1. Field of the Invention

The present invention relates to a heat exchanger which is suited for use for example as a condenser or evaporator employed in the car cooler or room air conditioning system, or as an oil cooler.

2. Description of the Prior Art

The heat exchanger of this type may, in a case, comprise brackets which are attached to its headers for mounting it on an object such as an automobile body. In a further case, the heat exchanger may also comprise pipe joints which are attached to its headers in order to connect some external pipings to the headers in fluid communication therewith.

In the former case wherein the brackets are incorporated, they are usually metal plates formed by the pressing method and secured to a body of the heat exchanger. For example, those brackets are spot-welded to the headers of the so-called multi-flow type heat exchanger, which comprises flat tubes disposed in parallel with one another and each having both ends connected to a left and right hollow headers in fluid communication with them.

If such plate-like brackets are spot-welded to the headers, particularly to the headers which are pipes round in cross section, then the contact between them cannot be of a sufficiently large area. Thus, it has been observed that vibration of an engine or automobile body causes the junction to be broken before long. There are further problems that stress concentration occurring in the headers is apt to deform them, and that the positioning or temporary setting of the headers cannot be done easily when welding.

In the latter case wherein the pipe joints are connected, a typical example of such pipe joints comprises, as shown in FIG. 14, a short pipe 251 having an end connected to the header 203 and a flared joint 252 integral with another end of the short pipe. Another mating joint attached to an end of the external piping may be connected to the flared joint 252 so as to form a coolant circulation path together with a compressor or the like.

However, this conventional structure is can not necessarily provide a junction having a sufficient surface area between the flared joint 252 and short pipe 251, or between the short pipe 251 and a wall of the header 203. Thus, there is a possibility that the attached flared joint 252 cannot be regarded as durable and rigid enough under some conditions. A bracket may, in such a case, be used to consolidate the flared joint 252 with the heat exchanger body, thereby resulting in the undesirable increase in the number of constituent parts of the heat exchanger.

OBJECT AND SUMMARY OF THE INVENTION

Therefore, a first object of the present invention is to provide a heat exchanger which comprises headers and brackets, which brackets are of a structure such that they can be attached strong and easily to the headers even if the latter are round in cross section.

A second object of the invention is to provide a heat exchanger comprising headers and brackets attached thereto, which brackets are easy to manufacture.

A third object is to provide a heat exchanger comprising headers, brackets and pipe joints, which pipe joints for connection to external pipings are secured rigid and stable to the headers without aid of any additional brackets.

These objects are achieved in the invention by a heat exchanger which comprises: a main body having a plurality of heat exchanging tubes and headers to which both ends of each tube are connected in fluid communication; headerheld members which are held in place on the headers and each selected from a group consisting of a bracket and an external pipe-connecting member; and each header-held member comprising a header-surrounding portion which fits sideways on the header and is joined integral therewith.

Other objects, features or advantages may become apparent from the drawings and description given below.

DETAILED DESCRIPTION OF PREFERRED EMBODIMENTS

Embodiments of the invention will now be described in detail referring to the accompanying drawings.

First Embodiment

Figure 2:
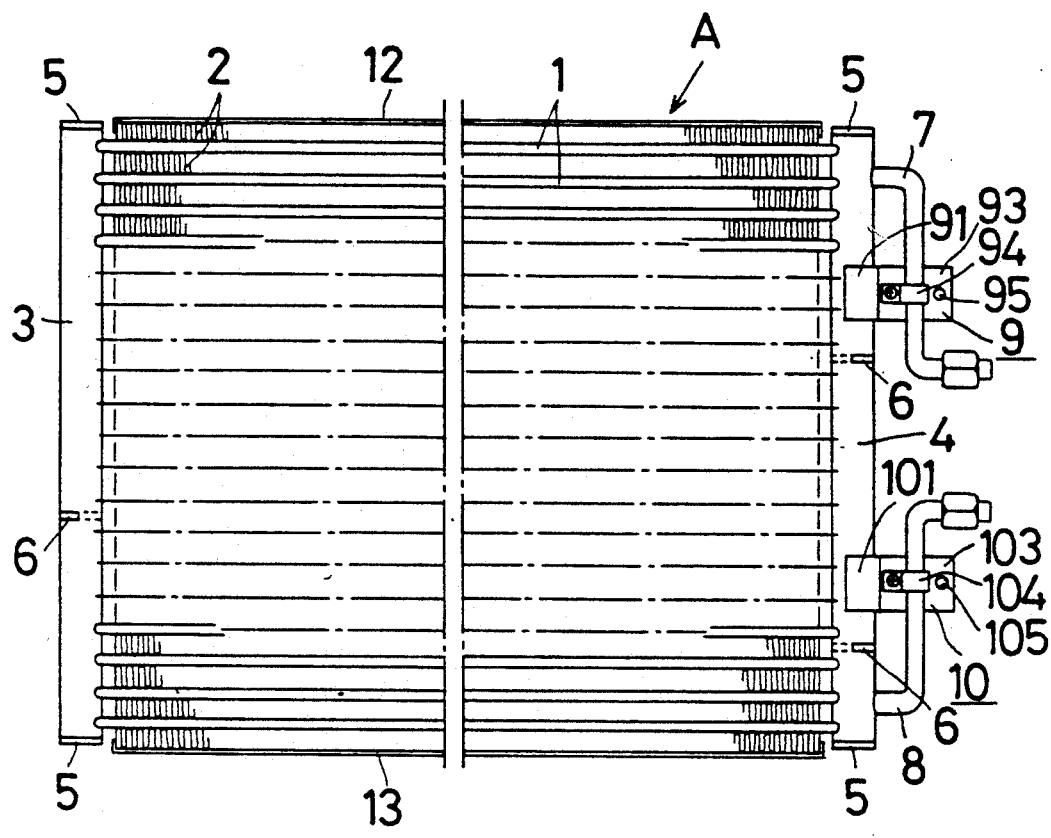
FIG. 2 is a front elevation showing the heat exchanger in the first embodiment, in its entirety.
Figure 3:
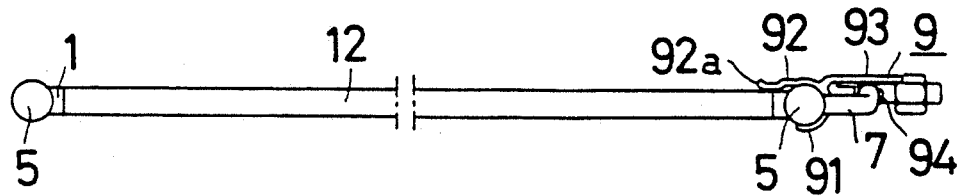
FIG. 3 is a plan view also showing the heat exchanger in its entirety.

A heat exchanger, which is made of aluminum (or its alloy) for use as a condenser in a first embodiment of this invention, is shown in FIGS. 2 and 3 in its entirety. A body "A" of the heat exchanger comprises: a plurality of horizontal tubes 1 stacked one on another; and corrugated fins 2 each interposed between the adjacent tubes 1.

The tubes 1 are formed flat by extruding an aluminum material. It is desirable that each tube has one or more internal partitions each tying an upper wall to a lower wall of the tube, integral therewith and extending longitudinally thereof. In this desirable structure, those partitions will form longitudinal discrete chambers within the tube and thus improve its pressure resistance. Such tubes may be manufactured easily from the so-called "harmonica" tube made by the extrusion process. Alternatively, the tubes 1 may be seam-welded pipes which each have a corrugated internal fin inserted and brazed thereto.

The external corrugated fins 2 are of substantially the same width as the tubes, and are fixedly secured to the adjacent tubes 1 by the brazing method. Further, the corrugated fins 2 which are also made of aluminum may desirably comprise louvers opened up from their walls.

The heat exchanger body "A" further comprises a pair of left and right headers 3 and 4. Each of those headers 3 and 4 is a seam-welded and pressure-resistant aluminum pipe round in cross section, and this pipe is made of a brazing sheet which has at least one surface covered with a brazing agent layer. Further, each header 3 and 4 has tube-insertion apertures which are formed through its peripheral wall and arranged longitudinally of the header at regular intervals. Both ends of each tube 1 are inserted in the apertures, and are brazed rigidly to the headers by means of the brazing agent layer.

Caps 5 are fitted on an upper and lower ends of the left and right headers 3 and 4. Each cap has an upright peripheral wall which tightly surrounds and is brazed to an outer surface of the header.

One or more partitions 6 are secured in the headers, so that the interior of the left header 3 is divided into two chambers disposed one on another, with the interior of the right header 4 being divided into three chambers also disposed one on another. Those partitions 6 are inserted in the headers through their circumferential openings, and are brazed thereto so as to become integral with the headers. Thus, there are provided a few groups of the tubes, so that a coolant entering the heat exchanger body "A" will flow meandering through all coolant paths of the tubes in each group. The coolant is subjected to a heat exchange process while flowing in such a meandering manner. The reference numerals 12 and 13 in FIG. 2 indicate an upper and lower side plates.

A coolant inlet pipe 7 made of aluminum and extending downwards has an end connected and brazed to an upper portion of the right header 4 in fluid communication therewith, the upper portion being adjacent to an upper end the right header. Similarly, a coolant outlet pipe 8 also made of aluminum but extending upwards has an end connected and brazed to a lower portion of the right header 4 in fluid communication therewith, the lower portion being adjacent to a lower end of the right header.

An upper aluminum bracket 9 is brazed to the right header at an intermediate portion thereof below the upper portion mentioned above. This bracket 9 not only reinforces the inlet pipe 7 but also is used to mount this heat exchanger on an automobile body. Similarly, a lower aluminum bracket 10 is brazed to the right header at another intermediate portion above the lower portion mentioned above. This bracket 10 also reinforces the outlet pipe 8 and at the same time is used to mount this heat exchanger on the automobile body.

Figure 1:
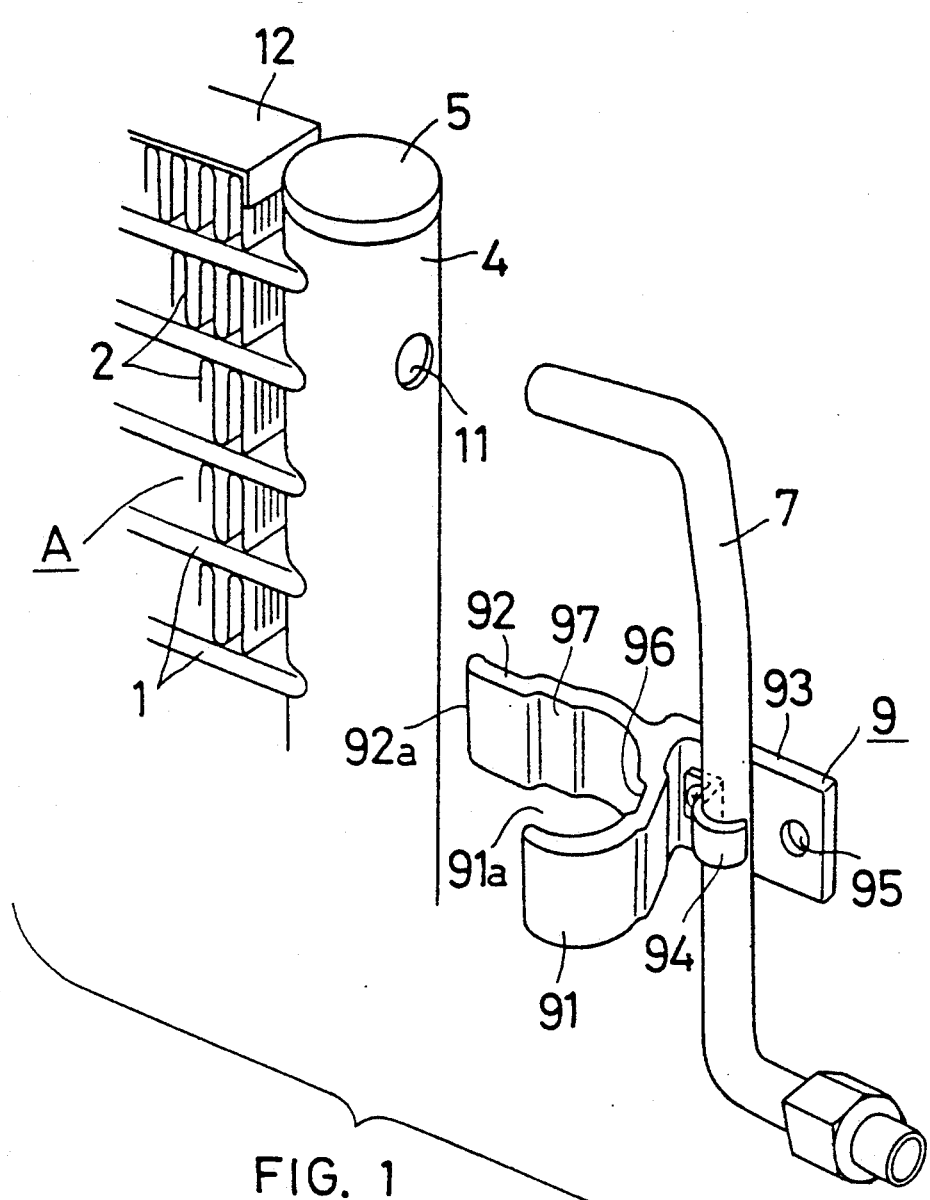
FIG. 1 is a perspective view showing in a disassembled state essential parts of a heat exchanger provided according to a first embodiment, wherein the parts include a bracket to which a coolant inlet pipe is fixedly secured.

Those brackets 9 and 10 are made of an extruded aluminum material, as illustrated in FIG. 1 which shows the upper bracket 9 by way of example.

The bracket 9 comprises, all as integral portions thereof: a header-surrounding portion 91 having an opening 91a and being substantially of a reverse C-shape in cross section fittable on an outer periphery of the header 4; an extension 92 extending from an end of the header-surrounding portion 91 so as to bear against side surfaces of the tubes; and a fastener portion 93 also extending from the surrounding portion 91 in linear alignment with the extension 92 but in a diction opposite thereto. Thus, the bracket is attached to the right header, with its opening 91a of the header-surrounding portion 91 fitting sideways on the header and being brazed thereto. The surrounding portion 91 may desirably be of a shape such that, once fitted on the header, it can stand itself in place without aid of any auxiliary member or tool. A clamp 94 is bolted to the fastener portion 93, in order to secure the coolant inlet pipe 7 onto this bracket 9.

The extension 92 of this bracket 9 functions as a positioning means. In detail, after the surrounding portion 91 is engaged with right header 4, the bracket 9 is turned around the header until its extension 92 contacts tubes 1. This operation may be done for example by forcing the fastener portion 93 to rotate anticlockwise in plan view. The contact of the extension 92 with the tubes 1 prevents a further rotation of the bracket 9, thus setting it in place. The bracket 9 must be set on the header's portion adequate to ensure such a function of the extension 92. A tip end 92a of the extension 92 is arcuate and thus spaced a slight distance from the tubes 1, in order that the contact of said extension with the tubes will not hurt them.

A recess 96, extending along the height of header-surrounding portion 91, is formed on an inner surface thereof at its vertical middle region. This recess 96 is advantageous for the following reason, particularly in a case wherein the header 4 is a cylindrically curled pipe of a brazing sheet. In a temporary assembly of the heat exchanger body, both side edges are abutted against one another and are located outwardly of the body, namely opposite to the tube-insertion apertures of the header. Then, the abutted edges are brazed one to another concurrently with the brazing of the tubes to the headers, with the surrounding portion 91 forming a vacant space between a surface of its recess 96 and the abutted edges. The brazing agent which is molten at that time will fill up and be retained in the space, whereby the abutted side edges are brazed perfect without causing any unbrazed cavities. A further recess 97 is formed on the extension 92 at its portion facing a boundary between the header 4 and the tubes 1. This further recess will also retain a sufficient amount of molten brazing agent to thereby ensure a sufficiently rigid brazing of the tubes 1 to the header 4.

The structure of the lower bracket 10 is the same as the upper one 9 described above. Its header-surrounding portion 101 fits on the outer periphery of the header 4, with the coolant outlet pipe 8 being similarly secured to a fastener portion 103 by means of a bolted clamp 104 of the lower bracket 10. Bores 95 and 105 of the fastener portions 93 and 103 are used to fix the brackets 9 and 10 on the automobile body or any other object.

Figure 4:
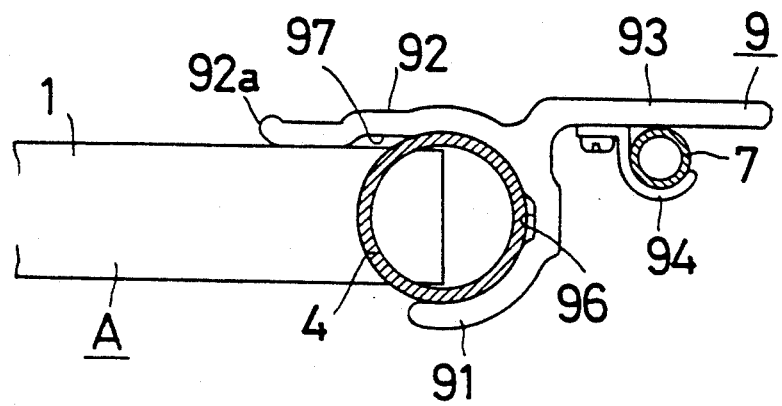
FIG. 4 is a horizontal cross section showing the bracket attached to a header of the heat exchanger.
Figure 5:
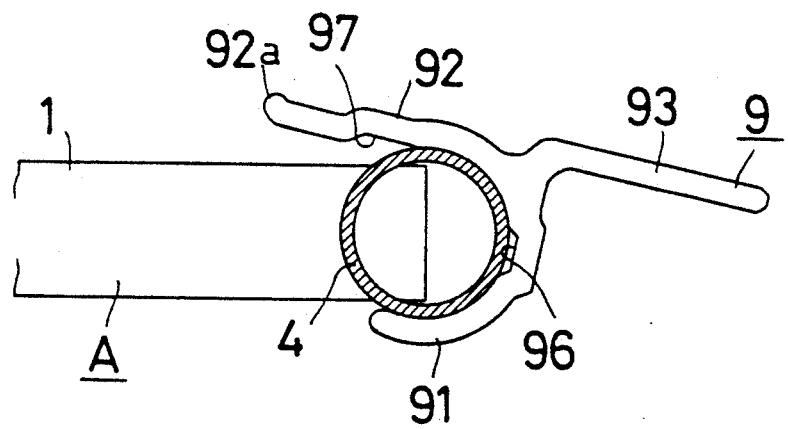
FIG. 5 is another cross section illustrating the bracket which is being attached to the header.

The coolant inlet and outlet pipes 7 and 8 are attached to the heat exchanger body "A", in the following manner using the brackets 9 and 10, respectively. At first, the upper bracket 9 will be engaged with the header 4 as shown in FIG. 5 so that the surrounding portion 91 tightly fits on the header, with an inner curved surface of the portion thereby coming into a close contact with an outer peripheral surface of the header. Next, bracket 9 is rotated to render its extension 92 to contact the tubes 1, to thereby take a regular position as shown in FIG. 4 (as already described above). Subsequent to these operations, an upper end of the coolant inlet pipe 7 is inserted in a side bore 11 of the right header 4. This temporary state of the pipe will then be fixed by bolting the clamp 94 to the bracket 9. Therefore, any other auxiliary member or tool need not be used for the temporary setting of the pipe.

Likewise, the coolant outlet pipe 8 will be set in place also using the lower bracket 10 on the right header 4.

After the brackets 9 and 10 are set in place in this manner together with the coolant inlet and outlet pipes 7 and 8, they are subjected to the so-called "one-shot brazing" process. In this process, the headers 3 and 4, the tubes 1 and the corrugated fins 2 are brazed one to another to form the heat exchanger body "A" while the temporarily set brackets and pipes are brazed to the right header 4. Such a one-shot brazing may be facilitated if the headers 3 and 4 and tubes 1 are made of the brazing sheet.

It will now be apparent that because the bracket 9 has the header-surrounding portion 91 which is of a shape closely fitting on the outer periphery of the header 4, a larger surface area is provided for the bracket 9 to be held thereon. Thus, with any cross-sectional shape of the header 4, it will not fail to rigidly secure the bracket 9 in place. Due to this feature, vibration of the automobile body or other conditions in use will not give rise to stress concentration at any particular portion of the header 4, which stress concentration would otherwise cause deformation of said header.

Since the bracket 9 is a section of an elongate extruded shape material, it does not incur any difficulty to give the abovedescribed specific shape to its header-surrounding portion 91, but any intricate pressing process can be dispensed with to improve not only the productivity of brackets themselves but also of the heat exchanger as a whole.

Second Embodiment

Another heat exchanger, which is also made of aluminum for use as a condenser in the car cooler system, provided in a second embodiment of this invention, is shown in FIGS. 6 to 13.

A heat exchanger body "A" illustrated in these figures is constructed in a manner similar to the first embodiment, and it comprises: a plurality of horizontal tubes 201 stacked one on another; corrugated fins 202 each interposed between the adjacent tubes 201; and a pair of left and right headers 203 to which both ends of each tube 201 are connected in fluid communication.

A coolant inlet-connecting member 204, as the external pipe-connecting member in the invention, is attached to an upper portion of the left header 203. A separable connector 206 is fixed on an end of the inlet-connecting member 204. An external pipe 205 for circulation of a coolant is held by the connector 206 so that the header 203 is in fluid communication with the pipe 205. The A coolant outlet-connecting member 207, as the external pipe-connecting member in the invention, is similarly attached to a lower portion of the right header 203.

Partitions 209 each secured in the left and right headers 203 divide the interiors thereof so that a coolant entering the heat exchanger body "A" will flow meandering through the groups of tubes 201. The reference numeral 210 denotes an upper and lower side plates which are disposed outside the upper and lower outermost corrugated fins 202, respectively, so as to protect them.

Figure 6:
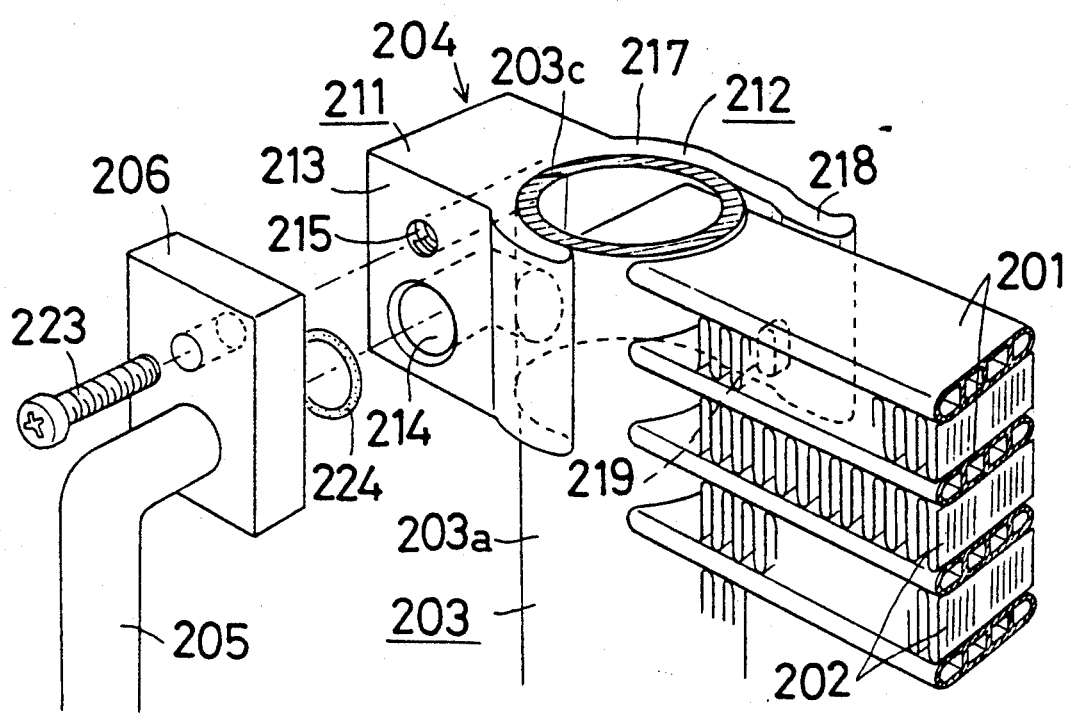
FIG. 6 is a perspective view of a connecting member attached to a header in a second embodiment.
Figure 7:
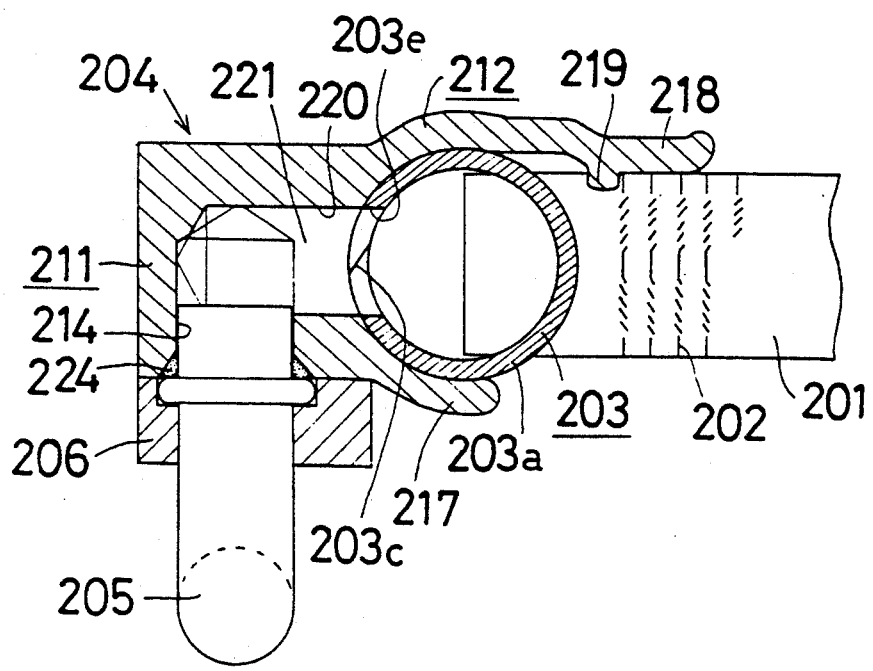
FIG. 7 is is horizontal cross section of the connecting member shown in FIG. 6.

The flat tubes 201 are sections cut from an elongate extruded aluminum shape material. They are the so-called "harmonica" tubes each comprising, as shown in FIG. 6, internal partitions which define longitudinal discrete chambers within the tube and thus improve its pressure resistance. Alternatively, the tubes may be seam-welded pipes.

The external corrugated fins 202 are manufactured by giving a corrugated shape to a sheet and by opening up louvers therefrom. The sheet is an aluminum brazing sheet having its surfaces clad with a brazing agent layer.

Figure 8:
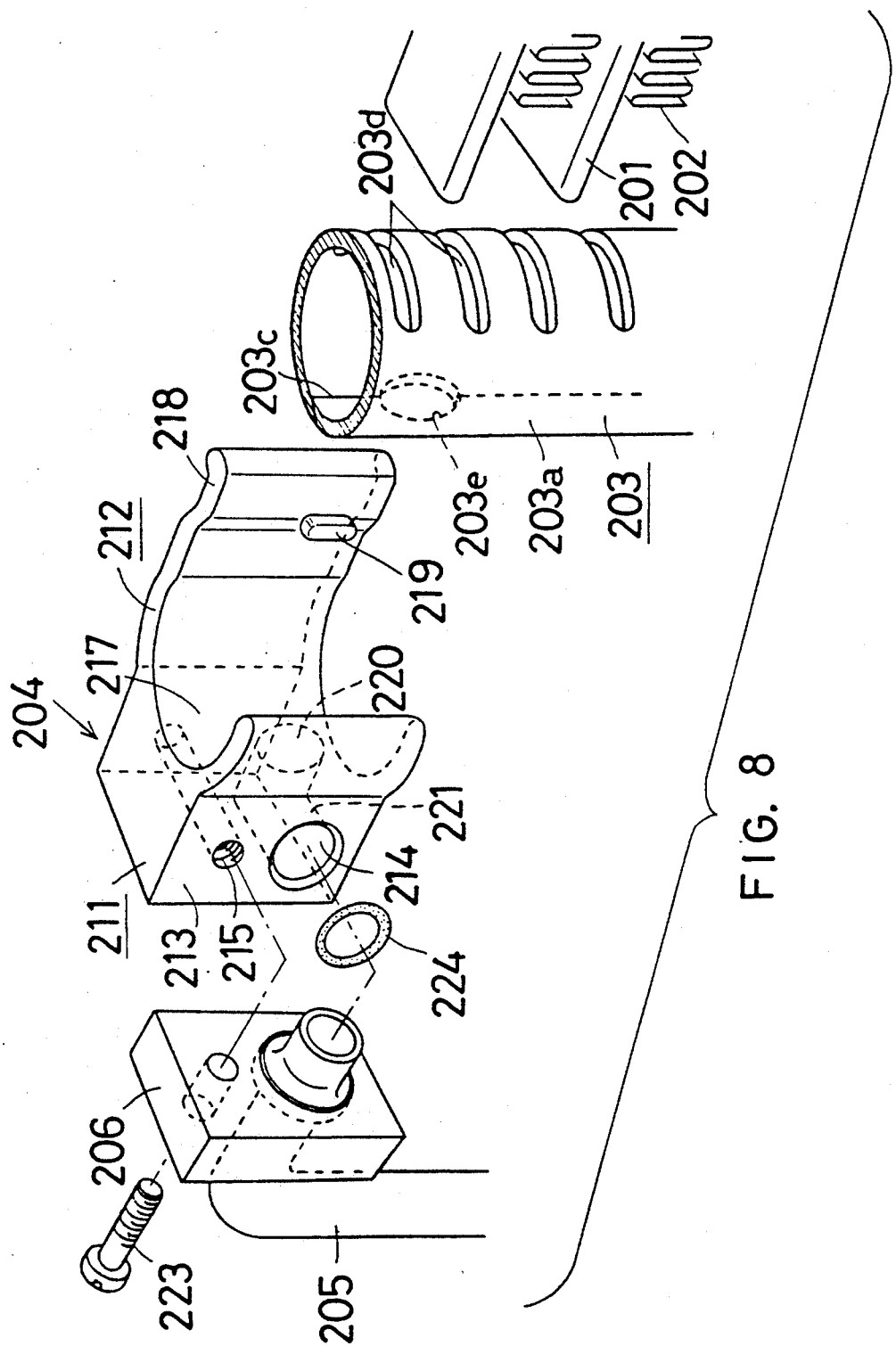
FIG. 8 is a perspective view illustrating the header shown in FIG. 6 in its state disassembled from heat exchanging tubes and the connecting member.
Figure 9A:
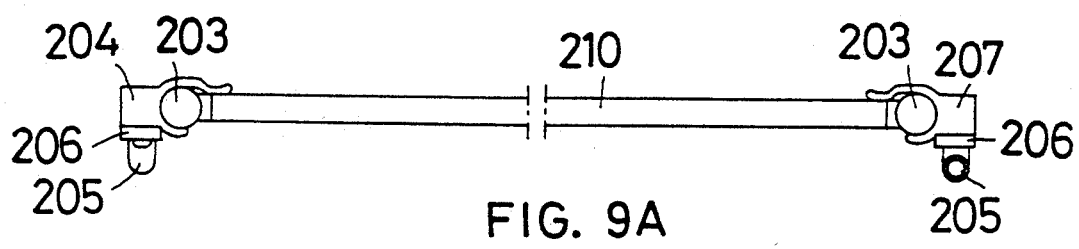
FIG. 9A is a front elevation showing the heat exchanger in the second embodiment, in its entirety.
Figure 9B:
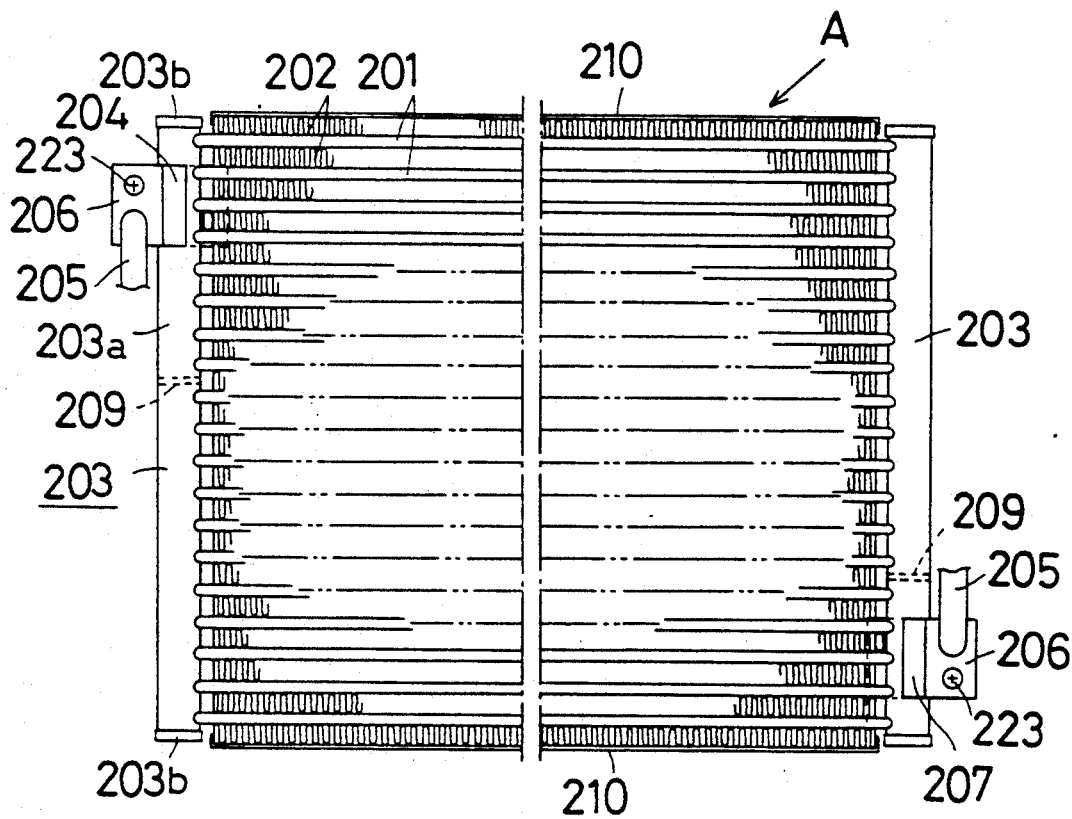
FIG. 9B is a plan view also showing the heat exchanger in its entirety.

The headers 203 are made of another brazing sheet which has at least one surface, particularly outer surface, covered with the brazing agent layer. This sheet is bent into a shape of cylindrical pipe 203a round in cross section, with both side edges of the sheet thereby being abutted against one another, as indicated at the reference numeral 203c. Aluminum header caps 203b, which are fitted on outer periphery of each header, close its upper and lower open ends. As shown in FIG. 8, the headers 203 have tube-insertion apertures 203d which are circumferential slits formed through peripheral wall portions of the headers and arranged longitudinally thereof at regular intervals, with the wall portions being located opposite to the abutted edges 203c. A round bore 203e for receiving a coolant from an inlet pipe is formed through a wall portion where the side edges 203c abut one another. For convenience in manufacture of the header pipe 203a, both halves of the round bore 203e are formed before the brazing sheet is bent to abut the side edges one another. Alternatively, the header pips 203a may be seam-welded pipe or an extruded pipe.

On the other hand, the coolant inlet-connecting member 204 is an aluminum piece for receiving a flange-like member (i.e., the connector 206 as will be described later), and comprises a joint body 211 and a header-surrounding body 212 integral therewith.

The joint body 211 looks like a block of parallelepiped having one flat surface 213 for receiving the flange-like member, and has a coolant inlet bore 214 which opens on this surface 213. A female-threaded bore 215 is also formed near the inlet bore.

The header-surrounding body 212 is composed of integral portions which are: a header-surrounding portion 217; an extension 218 extending therefrom and a towards the tubes 201 constituting a core of this heat exchanger; and an engageable lug 219 protruding from an inner surface of the inner curved surface which is fittable on an outer periphery of the header, elastically covering or embracing a little more than semicircle thereof. The extension 218 has a width covering at least two tubes 201, whereas the lug 219 is of a dimension which permits the lug to be inserted, more preferably to be forced, into a gap between two adjacent tubes 201. A coolant outlet opening 220 opens round on the inner surface of the header-surrounding portion 217. This opening 220 leads to a coolant inlet round opening 214 on the flange-connection surface 213, via an internal passage 221 formed through the pipe connecting member 204.

This connecting member 204, which in the second embodiment is an integral section of an extruded piece, can therefore be manufactured at a high productivity and a lower cost.

The outlet pipe-connecting member 207 is of the same structure as the inlet pipe-connecting member 204.

In manufacture of this heat exchanger, its parts are combined one with another to for a temporary assembly. As shown in FIGS. 6 and 8, the flat tubes 201 are arranged at first in parallel with one another in the direction of their width and at regular intervals. Subsequently, both ends of each tube 201 are inserted in the tube-insertion apertures 203d, with each corrugated fin 202 being interposed between the adjacent tubes. The partitions 209, the side plates 210 and other parts are also incorporated in the assembly.

The inlet pipe-connecting member 204 will be added to the assembly, in the following manner. At first, the surrounding body 212 is fitted sideways on the header 203. Since the surrounding portion 217 of said body thereby covers a little more than the semicircle of the header, the member 204 having this portion 217 is automatically prevented from disengaging from said header. Then, this connecting member 204 will be rotated around the header 203 at its height such that the coolant-receiving round bore 203e thereof coincides with the coolant outlet opening 220 of said member 204. In this way, the lug 219 fits in the gap between the tubes 201, and an inner surface of the extension 218 contacts core. The extension 218 and the lug 219 in this state respectively inhibits the further rotation of the member 204 in one direction and prevents the displacement thereof longitudinally of the header 203. Due to the forcible engagement of the lug 219 in addition to the embracing effect of the surrounding portion 217, this connecting member 204 remains self-retained in place on the heat exchanger body. In other words, the round bore 203a of the header is kept in alignment with the coolant outlet opening 220 of said member 204, without being assisted by any tool.

Also, the outlet pipe-connecting member 207 is attached to the other header in the same manner as the inlet pipeconnecting member.

Attached to the connecting member 204 of this heat exchanger is the separable connector 206. This connector, which is secured to said member 204 in a flange-connection manner by means of a bolt 223, carries an end of an external piping 205 as shown in FIGS. 6 and 8. Thus, a portion of for example a coolant circulation passage will be formed between the piping and the header.

Figure 10:
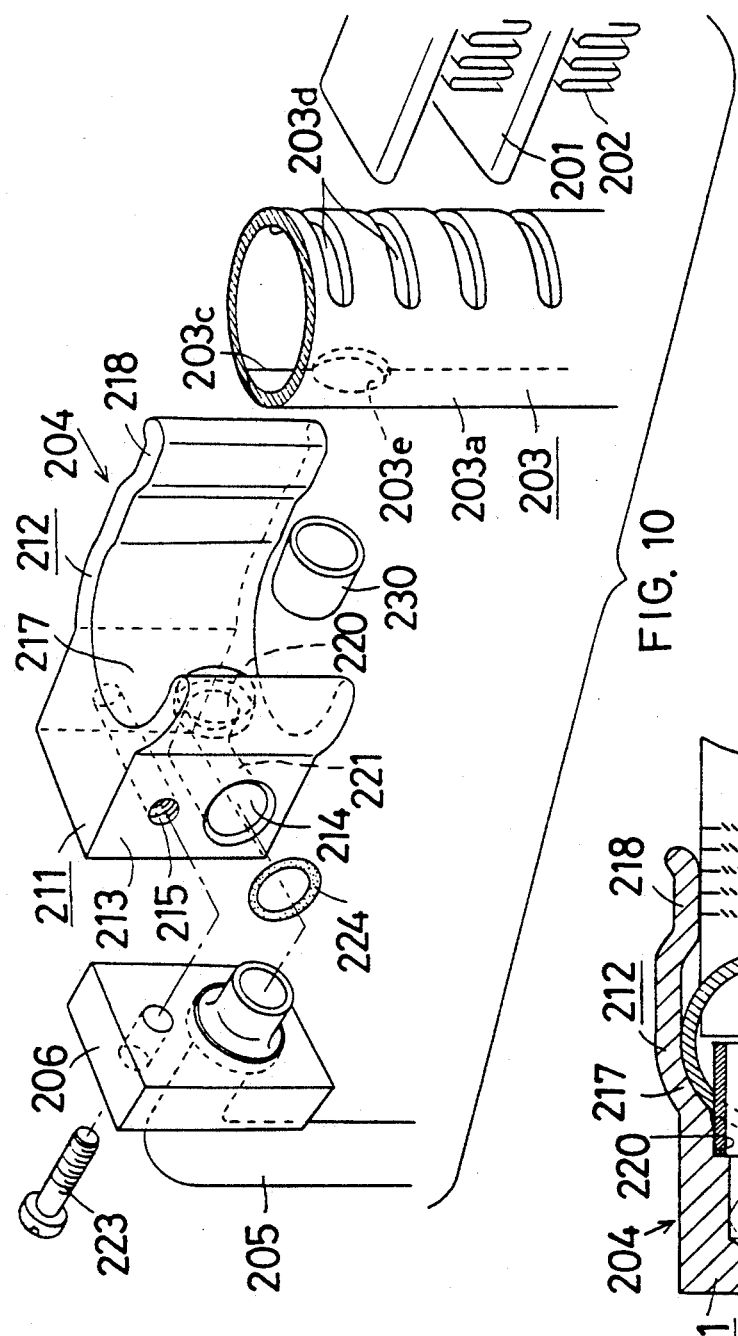
FIG. 10 shows the heat exchanger in a modification of the second embodiment, with its essential parts disassembled from one another.
Figure 11:
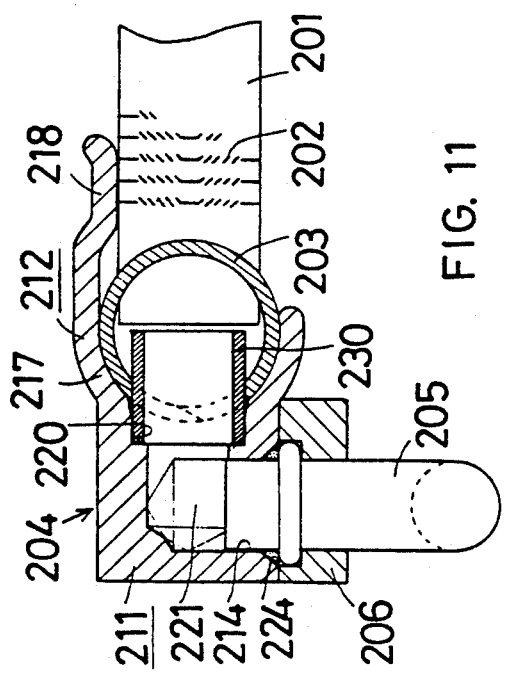
FIG. 11 is a horizontal cross section of the parts shown in FIG. 10.

A modification of the second embodiment is shown in FIGS. 10 and 11. In this modification, a short pipe 230 is used which has an end fitted in the outlet opening 220 of the connecting member 204. Another end of the short pipe protrudes into the header 203 through its coolant-receiving bore 203e, and this short pipe 230 is brazed in this state to said member and said header.

The short pipe 230 is a pipe formed by the seam-welding of an aluminum brazing sheet having at least its outer surface coated with a brazing agent layer. Due to the short pipe 230, the opening 220 of the connecting member 204 can be aligned readily with the coolant-receiving bore 203e of the header 203. Inadvertent rotation of said member 204 around the header is prevented by the short pipe present in the temporary assembly.

Figure 12:
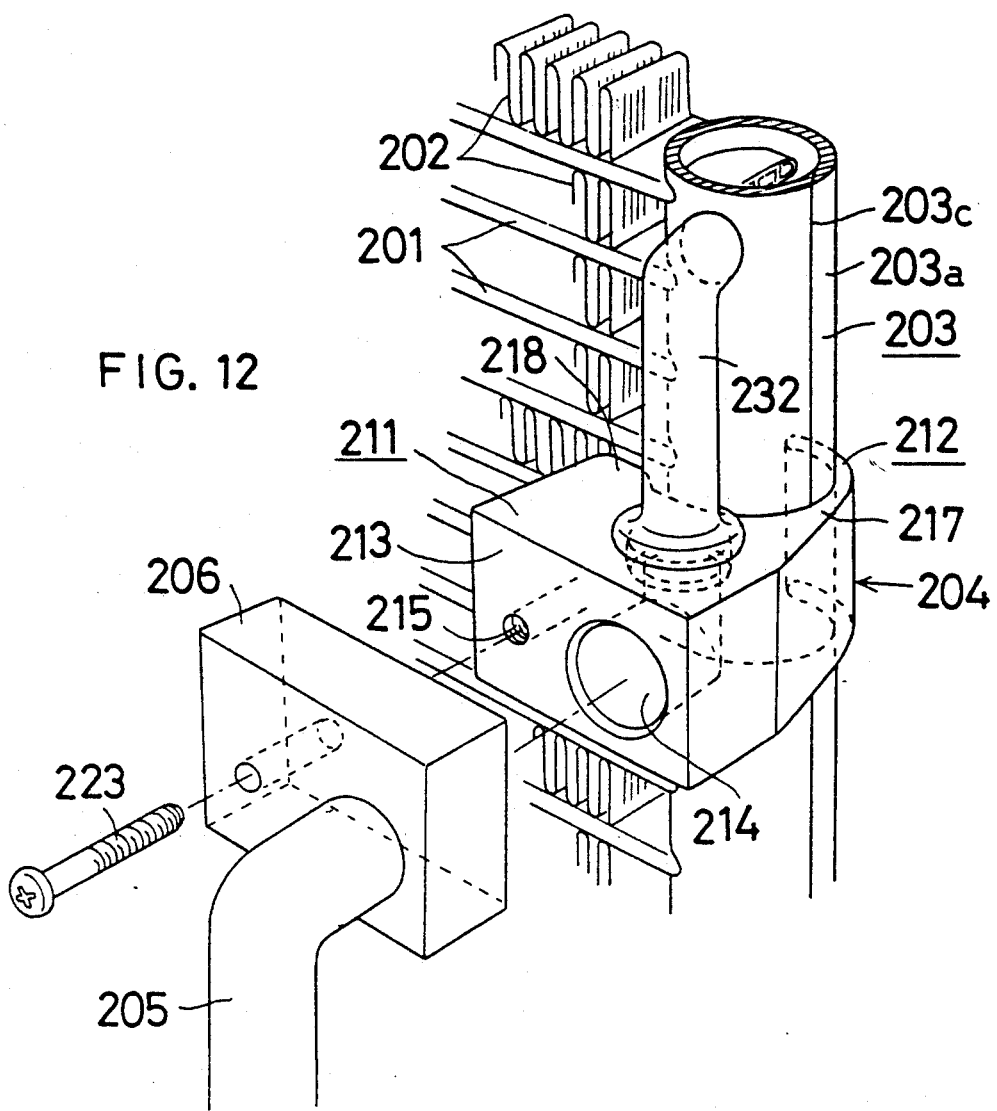
FIG. 12 shows the heat exchanger in a further modification of the second embodiment, also with its essential parts disassembled from one another.
Figure 13:
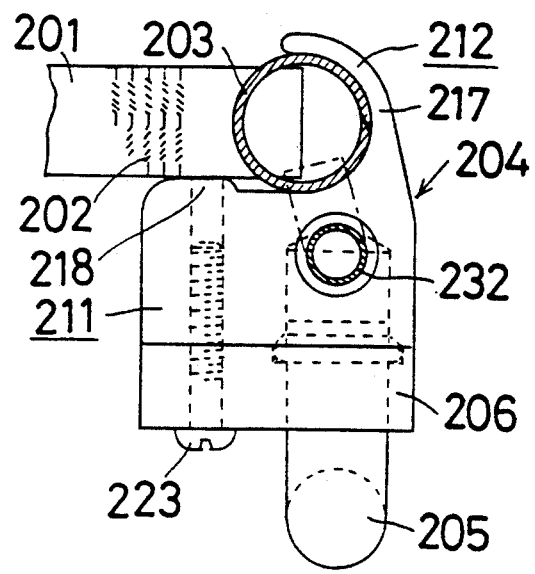
FIG. 13 is a horizontal cross section of the parts shown in FIG. 12.
Figure 14:
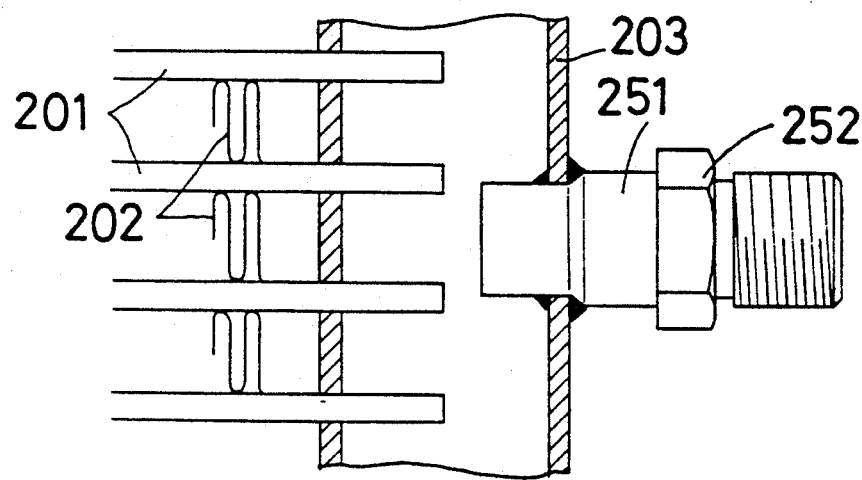
FIG. 14 is a perspective view of a prior art connecting member attached to a header.

In a further modification shown in FIGS. 12 and 13, an intermediate pipe 232 is interposed between the pipe-connecting member 204 and the header 203. The intermediate pipe 232 is also effective to retain said member in place free from any unintentional rotation within the temporary assembly.

The same reference numerals are allotted to the members or portions in the modifications shown in FIGS. 10 and 11 or shown in FIGS. 12 and 13, where said members function similarly to those in the embodiment shown in FIGS. 6 to 9A.

Although the connecting structure provided by the present invention is applied to both the coolant inlet and outlet, the structure may be applied only to the inlet or only to the outlet.

It will be apparent that the wide contact area between the connecting member and the header stabilizes and strengthens the connection of said member to the heat exchanger body, thus reliable connection is realized without relying upon any additional brackets or the like which would increase the number of parts.

What is claimed is:

1. A heat exchanger comprising:
   a main body having a plurality of heat exchanging tubes, at least one hollow header to which an end of each tube is connected in fluid communication, and fins each interposed between adjacent heat exchanging tubes;
   at least one bracket which is held in place on the header; and
   the bracket having a header-surrounding portion which fits sideways on the header and is joined integral therewith, wherein the header-surrounding portion of the bracket is self-retained in its position fitted on the header.

2. A heat exchanger as defined in claim 1, wherein the header-surrounding portion has an inner surface which fits on an outer surface of the header, and wherein the bracket further comprises an opening fitted sideways on the header.

3. A heat exchanger as defined in claim 1, wherein the bracket further comprises a fastener portion extending from the header-surrounding portion.

4. A heat exchanger as defined in claim 1, wherein the bracket further comprises an extension extending from the header-surrounding portion towards a tube so as to contact a side surface thereof.

5. A heat exchanger comprising:
   a first hollow header;
   a second hollow header spaced a predetermine distance from the first hollow header and extending in parallel therewith;
   a plurality of flat tubes each having both ends connected to the first and second hollow headers in fluid communication therewith;
   fins, each interposed between adjacent flat tubes;
   at least one bracket attached to one of the hollow headers, the bracket comprising:
   a header-surrounding portion having an opening fitted sideways on the hollow header;
   an extension extending from the header-surrounding portion towards a flat tube and contacting a side surface thereof; and
   a fastener portion also extending from the header-surrounding portion, wherein the header-surrounding portion is self-retained in its position fitted on the hollow header and is joined integral therewith.

6. A heat exchanger comprising:

a main body which is composed of at least one hollow header, a plurality of flat tubes each having an end connected to the header in fluid communication therewith, and fins each interposed between adjacent flat tubes;

at least one bracket attached to one of the headers;

the end of each flat tube being inserted in a tube insertion aperture of the header so as to be integrally and liquid-tightly brazed thereto; and the bracket comprising a header-surrounding portion fitted sideways on the header, and an extension extending from the header-surrounding portion towards a flat tube and contacting a side surface thereof, wherein each bracket has a recess to prevent any unbrazed cavities from being produced in a region adjacent to the header's portion connected to the flat tube.

7. A heat exchanger as defined in claim 6, wherein the header-surrounding portion of the bracket has an opening fittable sideways on the header such that the bracket is self-retained in its position fitted on the header.

8. A heat exchanger as defined in claim 6, wherein the extension has a tip end curved apart from the tube.

9. A heat exchanger as defined in claim 6, wherein the bracket is an extruded integral piece, and further comprises a fastener portion extending from the header-surrounding portion.

10. A heat exchanger comprising:
a first hollow header;
a second hollow header spaced a predetermined distance from the first header and extending in parallel therewith;
flat tubes, each having opposite ends connected to the hollow headers in fluid communication therewith;
fins, each interposed between adjacent tubes; and
at least one bracket attached to at least one of the hollow headers.
the ends of each flat tube being inserted in tube-insertion apertures of the headers so as to be integrally and liquid-tightly brazed thereto;
with each bracket being an integral piece and comprising: a header-surrounding portion having an opening fitted sideways on the header; an extension extending from the header-surrounding portion towards a flat tube; a fastener portion also extending form the header-surrounding portion, and a recess to prevent any unbrazed cavities from being produced in a region adjacent to the header's portion connected to the tubes, wherein the header-surrounding portion is fitted on the header such that the extension contacts a side surface of the flat tube, and the header-surrounding portion is joined integral with the hollow header.

11. A heat exchanger as defined in claim 10, wherein an external piping for allowing a coolant to flow through the heat exchanger is fixed to the fastener portion of the bracket and thus connected to the hollow header.

12. A heat exchanger comprising:
a first hollow header;
a second hollow header spaced a predetermined distance from the first hollow header and extending in parallel therewith;
a plurality of flat tubes each having both ends connected to the first and second hollow headers in fluid communication therewith;
fins each interposed between adjacent flat tubes;
each hollow header being a pipe composed of a brazing sheet which has at least one surface covered with a brazing agent layer, wherein the brazing sheet is bent to form the pipe such that both side edges of the brazing sheet are abutted against one another to become integral due to the brazing agent layer;
both ends of each tube being inserted in, and liquid-tightly brazed by the brazing agent layer to, tube-insertion apertures which are formed through walls of the hollow headers;
a bracket attached to at least one of the headers;
the bracket being an extruded integral piece and comprising:
a header-surrounding portion which is formed with an opening fitted sideways on the hollow header and has an inner curved surface fitted on and brazed to an outer peripheral surface of the hollow header;
an extension extending from the header-surrounding portion towards the flat tubes and being set in place to contact side surfaces thereof;
a fastener portion also extending form the header-surrounding portion;
a first recess formed on an inner surface of the extension and facing a boundary region between the hollow header and the flat tubes;
a second recess formed on the inner curved surface of the header-surrounding portion and longitudinally thereof, with the second recess facing the abutted side edges of the brazing sheet forming the pipe; and
the first and second recesses prevent any unbrazed cavities from being produced at positions where the recesses are located,
wherein the header-surrounding portion is fitted on and integrally brazed to the hollow header, with the extension being in contact with the side surfaces of the flat tubes.

* * * * *